United States Patent [19]

Sawabe et al.

[11] Patent Number: 4,523,374
[45] Date of Patent: Jun. 18, 1985

[54] COMMUTATOR FOR FLAT MOTOR

[75] Inventors: Mitsuo Sawabe, Narita; Kouichi Imai, Kawasaki, both of Japan

[73] Assignees: Nihon Radiotor Co., Ltd.; Toho Tekko Co., Ltd., both of Tokyo, Japan

[21] Appl. No.: 583,774

[22] Filed: Feb. 27, 1984

Related U.S. Application Data

[62] Division of Ser. No. 368,501, Apr. 14, 1982, Pat. No. 4,453,102.

[30] Foreign Application Priority Data

Apr. 14, 1981 [JP] Japan .................................. 56-55134

[51] Int. Cl.³ .............................................. H01R 43/08
[52] U.S. Cl. ........................................ 29/597; 310/237
[58] Field of Search ................... 29/597, 598; 310/233, 310/235, 237, 42, 43

[56] References Cited

U.S. PATENT DOCUMENTS

| 1,592,326 | 7/1926 | Bastian | 29/597 X |
| 1,757,393 | 5/1930 | Schmid | 310/235 |
| 3,681,027 | 1/1975 | Allen | 29/597 |

Primary Examiner—Carl E. Hall
Attorney, Agent, or Firm—Gordon W. Hueschen

[57] ABSTRACT

Commutator for a flat motor which includes fan-shaped brush contact pieces and connection pieces upraised from said brush contact pieces and kept electrically integral therewith wherein a plurality of segments made of superior conductive material are arranged in an annular form in a specified spaced apart relation in such a way as said connection pieces are positioned at an inner edge, said segments are insulated with each other by an insulator material, top ends of said connection pieces are bent to an inverted-U shape, their leading ends are buried in said insulator material, connection wires of an armature winding are pushed into the slits made at the top ends of said connection pieces so as to connect the segments with the armature winding.

4 Claims, 10 Drawing Figures

U.S. Patent   Jun. 18, 1985   4,523,374
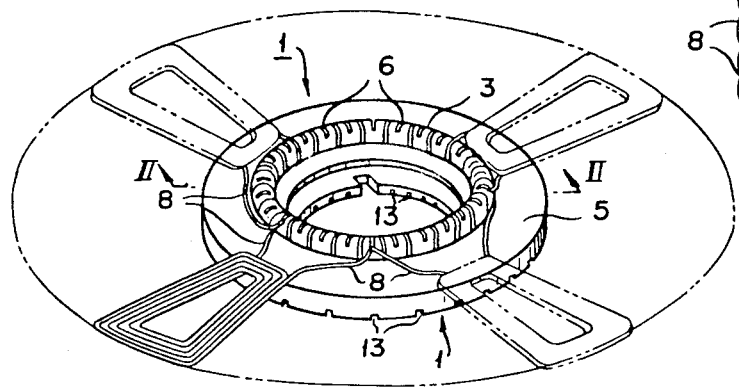
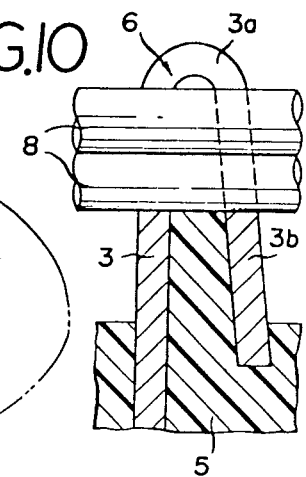
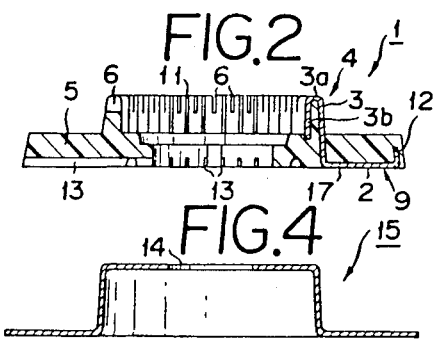
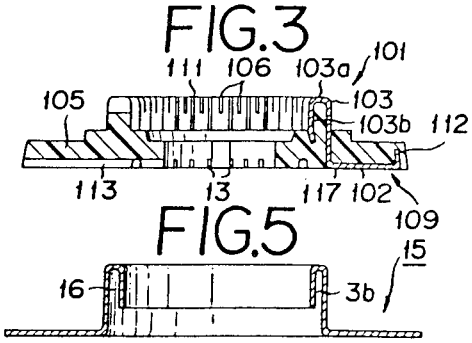
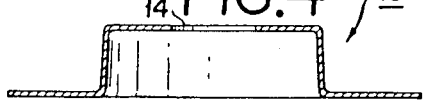
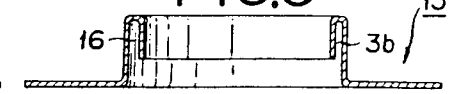
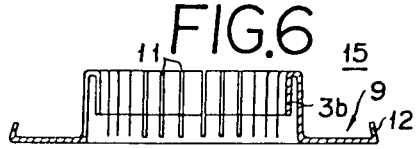
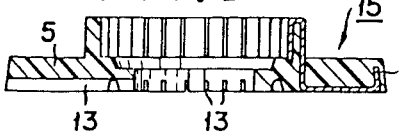
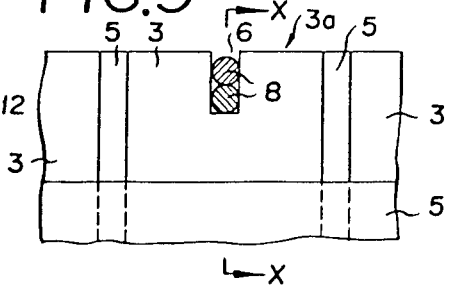

4,523,374

COMMUTATOR FOR FLAT MOTOR

This is a division of application Ser. No. 368,501, filed Apr. 14, 1982, now U.S. Pat. No. 4,453,102.

BACKGROUND OF THE INVENTION

1. Field of the Invention

This invention relates to a commutator for a flat motor and its manufacturing process, and more particularly to such a commutator for a flat motor as having a disk-shaped winding armature for facilitating a connection to the armature winding and enabling a production of higher output, and its manufacturing process.

2. Description of Prior Arts

In recent years, there has been proposed a commutator for a flat motor which includes fan-shaped brush contact pieces and connection pieces upraised from said brush contact pieces and kept electrically integral therewith wherein a plurality of segments made of superior conductive material are arranged in an annular form, said segments are insulated with each other by an insulator material, connection wires of an armature winding are pushed into the holes made at the top ends of said connection pieces so as to connect the segments with the armature winding. (U.S. Pat. No. 3,524,251).

However, this type of flat commutator shows not only a difficulty in its manufacturing, but also a restriction in an area occupied by the armature to be formed at the outside of the tab due to the fact that the tab is formed at an outer edge end of the brush contact piece. In particular, when the armature is fixed to a rotary axis of the fan of a direct drive type, a requirement for making a large effective area of the fan causes some limitations over an outer diameter of the flat motor. Due to this fact, it is necessary to approach a position of the tab to a rotary axis as close as possible and make a wide distance between an outer diameter of the armature and the tab in order to make a large area of the armature. Since an output of the motor is proportional to an area of armature, said distance should be increased.

Thus, it is an object of the present invention to provide a novel commutator for a flat motor and its manufacturing process.

It is another object of the present invention to provide a commutator for a flat motor which may cause the motor to produce a higher output power.

It is still further object of the present invention to provide a simple manufacturing process for a commutator for a flat motor.

SUMMARY OF THE INVENTION

These objects described above are accomplished by a provision of a commutator for a flat motor which includes fan-shaped brush contact pieces and connection pieces upraised from said brush contact pieces and kept electrically integral therewith wherein a plurality of segments made of superior conductive material are arranged in an annular form in a specified spaced apart relation in such a way as said connection pieces are positioned at an inner edge, said segments are insulated with each other by an insulator material, top ends of said connection pieces are bent to an inverted-U shape their leading ends are buried in said insulator material, connection wires of an armature winding are pushed into the slits made at the top ends of said connection pieces so as to connect the segments with the armature winding.

BRIEF DESCRIPTION OF THE DRAWINGS

FIG. 1 is a perspective view for schematically illustrating an armature for a flat motor constructed in accordance with the present invention.

FIG. 2 is a sectional view taken along the line II—II of FIG. 1.

FIG. 3 is a sectional view similar to that of FIG. 2 for illustrating another preferred embodiment of the present invention.

FIGS. 4 to 8 are a sectional view for illustrating each of the manufacturing steps of the armature constructed in accordance with the present invention.

FIG. 9 is an enlarged view for showing a substantial part of FIG. 3 with its connected condition.

FIG. 10 is a sectional view taken along the line X—X of FIG. 9.

PREFERRED EMBODIMENT OF THE INVENTION

As shown in FIGS. 1 and 2, segments 4 which constitute a commutator 1 are provided with a fan-shaped brush contact piece 2 and a connector piece 3 upraised from the brush contact piece 2 and electrically integral therewith, the segment being formed of a superior conductive material such as copper and copper alloy etc. The segments 4 are constructed such that a top end 3a of the connector piece 3 is bent to form an inverted U shape, a width of said connector piece being kept constant. A plurality of segments 4 are arranged in an annular form in a specified spaced apart relation in such a way as the connector piece 3 is positioned at their inner edges. A plurality of segments 4 arranged in an annular form are molded by the resin insulator material 5 in an annular form and insulatively fixed thereto. Outer edge end of said segment 4 is formed with a bent part 12 for use in preventing a slip-off of the insulator material 5 when the material is molded. Said inverted-U shaped bent edge 3b is buried in the insulator material 5. In the top end 3a of the inverted-U shaped bent portion, said insulator material 5 is usually charged in integral with the molded part. And it is possible to fix a reinforcement member (not shown) of copper or copper alloy to this bent portion. In said U-shaped bent top end 3a are cut some slits 6. In FIG. 2, a left half section corresponds to the slits 11, 13.

FIG. 3 illustrates another preferred embodiment of the present invention in which a bent end 103b buried in the insulator material 5 is further bent thereinto. In FIG. 3, a reference numeral added by 100 corresponds to the same component element as that shown in FIG. 2.

When such segments as described above are manufactured, at first, a sheet of good conductive material, for example, a copper plate having a silver of 0.03 wt % is pressed to form a hat-like member 15 having a hole 14 at its central part and a flange part 9 at its lower portion, as shown in FIG. 4. Then, as illustrated in FIG. 5, the central hole 14 is drawn inwardly to form a bent part 3b, thereby an annular projection having its top end 3a showing an inverted U-shape is formed. A width of the space 16 at the bent portion is substantially the same as, for example, that of the copper plate. Into the space 16 formed by the bent part 3b is, as required, press fitted an annular reinforcement member or another type of annular reinforcement member coated with a conductive adhesive agent. In this condition, some slits 11 are cut, as shown in FIG. 6, down to the flange 9 in a specified spaced apart relation, then an odd number of connector pieces 3 are formed. Portions corresponding to the slits 13 at the circumference of the flange 9 to be described later are partially cut off and then the remained non-cut portions are bent upwardly. Thus, said comb-like hat shaped member 15 forms a continuous body which is connected only with the flange. In this case, a an annular reinforcement member if used, also is cut by the slits 11 so that the reinforcement member is divided in correspondence with the connector pieces 3. Further, as shown in FIG. 7, the hat-shaped member 15 having said slits 11 is molded to show an annular shape by the synthetic resin insulator 5, for example, FUDOWLITE F5760F (ammonia free phenolic resin with glass powder made by Fudow Chemical Co., Ltd.) with a bottom surface of the flange 9 being exposed. Insulator resin is charged in said slits 11 and each of the connector pieces 3 is insulated with each other. Then, as shown in FIG. 8, a plurality of slits 13 are cut in a radial form in the flange 9 in correspondence to said slits 11 and also in deeper than a thickness of said flange 9, thereby a plurality of fan-shaped divided contact pieces 2 are formed with being separated to each other. Surfaces of the contact pieces 2 become a brush sliding contact surface 17. Then, as shown in FIGS. 1 and 2, slits 6 for a wire connection are cut at the top end 3a in the bent part of the connector piece 3 so as to form a commutator 1.

In the commutator 1 thus formed, as shown in FIGS. 9 and 10, the connecting wires 8 of a winding constituting the armature 7 are pushed into the slits 6, and then they are connected with each other by a so-called hot-stake process.

This hot-stake process is operated such that the connection wires (enamel coated wires) 8 and the commutator 1 are heated by a hot tip heated up to a desired temperature, the connection wires 8 are pushed into the slits 6 by the hot tip, and at the same time the wires are further heated by their energization, finally a thermal press fitting is performed. This hot-stake process enables a breakage of insulation by applying a thermal energy, and also enables both electrical and mechanical connections even if the insulation of the connected wires (enamel coated wires) is peeled off.

As described above, in accordance with the present invention, a top end of the connector piece is bent to form an inverted-U shape and buried into the insulator material, so that a strength of the commutator may be improved and it becomes possible to tie the connection wires to the commutator by applying so-called hot-stake process, and a fast and rigid connection between the commutator and the armature winding may be performed.

The connector piece shows a specified width irrespective of a fan-shape form of the segment, so that a strength of the commutator may substantially be improved.

In accordance with the method of the present invention, each of the segments is not assembled after its manufacturing, but an integrally formed hat-shaped member is bent, some slits are cut in the member so as to form the connection pieces, then the insulator material is molded therein, the flange is cut to make the segments. In view of this fact, its manufacturing may be performed in a quite simple manner.

In the commutator of the present invention, the connector pieces (tab pieces) are formed at the points nearest to a rotary axis, so it is possible to keep a wide distance from an outer edge of said armature to the connector piece even if an outer diameter of the armature is the same as that of a conventional one and therefore an area of the armature may be increased.

What is claimed is:

1. Process for manufacturing a commutator for a flat motor comprising the steps of:
punching out a central part of a hat-shaped member made of superior conductive material having a flange part at a lower portion thereof, bending the top end part of said hat-shaped member inwardly so as to form an annular projection of inverted U-shape;
making slits in a specified spaced apart relation in said annular projection from its top end down to a surface of the flange so as to form an odd number of connection pieces separated by the slits, respectively;
while keeping both the bottom surface of the flange in said connection piece and said annular projection exposed, burying the bent leading end of said annular projection in a molding in an annular form with insulation resin material which insulates said slits and overlies said flange;
cutting the flange part of the molded components in a radial form in a specified spaced apart relation in response to said slots so as to form some radial slits as well as to make a plurality of fan-shaped divided contact pieces; and
forming some wire connection slits at the top ends of said connection pieces.

2. Process as set forth in claim 1 wherein the circumferential edge of said flange is partially cut in response to said slits in the projection before a molding of insulation material is performed, and bent upwardly so as to make an anti-slip off member.

3. Process as set forth in claim 1 wherein the insulation material is a phenol resin.

4. Process for manufacturing a commutator for a flat motor comprising the steps of:
starting with a hat-shaped member made of superior conducting material having a punched-out central part and a flange part at a lower portion thereof, the top end part of said hat-shaped member being bent inwardly so as to form an annular projection of inverted U-shape;
making slits in a specified spaced apart relation in said annular projection from its top end down to a surface of the flange so as to form an odd number of connection pieces separated by the slits, respectively;
exposing both the bottom surface of the flange in said connection piece and said annular projection, burying the bent leading end of said annular projection, molding in an annular form with insulation resin material and insulating said slits;
cutting the flange part of said molded member in a radial form in a specified spaced apart relation in response to said slits so as to form some radial slits as well as to make a plurality of fan-shaped divided contact pieces; and
forming some wire connection slits at the top ends of said connection pieces.

* * * * *

UNITED STATES PATENT AND TRADEMARK OFFICE
CERTIFICATE OF CORRECTION

PATENT NO. : 4,523,374

DATED : June 18, 1985

INVENTOR(S) : Mitsuo Sawabe and Kouichi Imai

It is certified that error appears in the above-identified patent and that said Letters Patent is hereby corrected as shown below:

Title page, [73] Assignees:; "Radiotor" should read
  -- Radiator --

Title page, [56], References Cited, U.S. PATENT DOCUMENTS,
  line 3; "3,681,027" should read -- 3,861,027 --

Col. 1, line 48; after "still" insert -- a --

Col. 3, line 6; delete "a"

Col. 3, line 18; change "slits" to -- slots --

Col. 4, line 28; change "slots" back to -- slits -- and "slits" back to -- slots --

Signed and Sealed this

Twenty-sixth Day of November 1985

[SEAL]

Attest:

DONALD J. QUIGG

Attesting Officer     Commissioner of Patents and Trademarks